(12) United States Patent
Bradley

(10) Patent No.: US 8,478,339 B2
(45) Date of Patent: Jul. 2, 2013

(54) METHOD FOR ACCESSING AT LEAST ONE SERVICE AND CORRESPONDING SYSTEM

(75) Inventor: Paul Bradley, Austin, TX (US)

(73) Assignee: Gemalto SA, Meudon (FR)

( * ) Notice: Subject to any disclaimer, the term of this patent is extended or adjusted under 35 U.S.C. 154(b) by 116 days.

(21) Appl. No.: 13/175,352

(22) Filed: Jul. 1, 2011

(65) Prior Publication Data

US 2013/0005402 A1     Jan. 3, 2013

(51) Int. Cl.
*H04W 88/02* (2009.01)
(52) U.S. Cl.
USPC .......................................................... 455/558
(58) Field of Classification Search
USPC ............... 455/558, 412.1, 255, 260; 702/123; 370/328; 235/492; 719/315; 717/113
See application file for complete search history.

(56) References Cited

U.S. PATENT DOCUMENTS

| | | | |
|---|---|---|---|
| 2005/0042996 A1* | 2/2005 | Khlat et al. | 455/255 |
| 2006/0129979 A1* | 6/2006 | Fernando et al. | 717/113 |
| 2010/0135204 A1* | 6/2010 | Witzel et al. | 370/328 |

* cited by examiner

*Primary Examiner* — Diane Mizrahi
(74) *Attorney, Agent, or Firm* — Buchanan Ingersoll & Rooney PC

(57) ABSTRACT

The invention relates to a method for accessing at least one service. A host device is coupled to a chip. The chip stores data relating to at least one test Subscriber Identity Module (SIM) type application and/or data relating to at least one SIM type application. The host device sends to the chip a command for switching from a first application to a second application. The first application is either a test SIM type application or a SIM type application. The second application is either a SIM type application or a test SIM type application. And the chip carries out an activation of the second application and a de-activation of the first application. The invention also relates to a corresponding system for accessing at least one service.

10 Claims, 1 Drawing Sheet

METHOD FOR ACCESSING AT LEAST ONE SERVICE AND CORRESPONDING SYSTEM

FIELD OF THE INVENTION

The invention relates, in a general manner, to a method for accessing at least one service.

Moreover, the invention also pertains to a system for accessing at least one service.

STATE OF THE ART

As known per se, a chip is soldered to a Printed Circuit Board (termed PCB) of a host device, such as a mobile (tele) phone.

The chip, also termed embedded chip, supports a Subscriber Identity Module (or SIM) application. The SIM application allows the mobile phone to authenticate to one mobile radio-communication network by using a network authentication key.

However, as the chip is not easily removable from the mobile phone, such a known solution does not allow changing from the supported SIM application to a test SIM application. The test SIM application may allow the mobile phone to authenticate to a mobile radio-communication network or a simulated mobile radio-communication network while using a different network authentication key.

There is a need to offer one or several services allowing, for test reasons, to access one or several mobile radio-communication networks without needing to change neither the host device nor the embedded chip.

SUMMARY OF THE INVENTION

The invention proposes a solution for satisfying the just hereinabove specified need by providing a method for accessing at least one service. A host device is coupled to a chip. The chip stores data relating to at least one test SIM type application and/or data relating to at least one SIM type application.

According to the invention, the method comprises the following steps. The host device sends to the chip a command for switching from a first application to a second application, the first application being either a test SIM type application or a SIM type application, the second application being either a SIM type application or a test SIM type application. And the chip carries out an activation of the second application and a de-activation of the first application.

The principle of the invention consists in that a host device transmits a message for commanding a coupled chip that supports one or several test SIM type applications and/or one or several SIM type applications to change from a currently activated network access application to another network access application. Further to a receipt of such a command and its execution, the chip allows activating the latter network access application instead of the currently network access activated application.

The currently activated network access application, as first and original application, may be a SIM type application or a test SIM type application. The application to be activated, as second and target application, may be a test SIM type application or a SIM type application.

It is to be noted that a SIM type application includes, among others, a SIM for a Global Service for Mobiles (or GSM) type network, a Universal Subscriber Identity Module (or USIM) for a mobile radio-communication network relating to a Universal Mobile Telecommunications System (or UMTS), a Code Division Multiple Access (or CDMA) Subscriber Identity Module (or CSIM) and/or an Internet Protocol Multimedia Subsystem (or IMS) Subscriber Identity Module (or ISIM) application.

Likewise, it is to be noted that a test SIM type application includes, among others, a test SIM, a test USIM for a mobile radio-communication network relating to a UMTS, a test CSIM and/or a test ISIM application.

The invention solution makes it possible, via a command originating from or through the host device, to provide access to a service corresponding to a target application to be activated thanks to the command.

Thus, a user does need to change neither the host device nor the chip, so as to change from an activated application to an application to be activated that are both supported by the chip.

It is to be noted that a protocol to be used for transporting the command intended to the chip may be of any type.

According to a further aspect, the invention is a system for accessing at least one service. The system comprises a host device and a chip coupled to the host device. The chip comprises means for storing data relating to at least one test SIM type application and/or data relating to at least one SIM type application.

According to the invention, the host device is adapted to send to the chip a command for switching from a first application to a second application, the first application being either a test SIM type application or a SIM type application, the second application being either a SIM type application or a test SIM type application. And the chip is adapted to carry out an activation of the second application and a de-activation of the first application.

As a host device, it may be a mobile phone, a wireless module, a Personal Digital Assistant (or PDA), a palm-top computer, a laptop computer, a netbook, a portable TeleVision (or TV), a tablet computer, a portable Personal Computer (or PC), as personal computer device.

As a chip, it may be an embedded chip that is fixed, possibly in a removable manner, to a PCB of the host device, or a removable chip that is carried by a medium like a card, a dongle or the like.

BRIEF DESCRIPTION OF THE DRAWINGS

Additional features and advantages of the invention will be more clearly understandable after reading a detailed description of one preferred embodiment of the invention, given as an indicative and non-limitative example, in conjunction with the following drawings.

DETAILED DESCRIPTION

Figure 1:
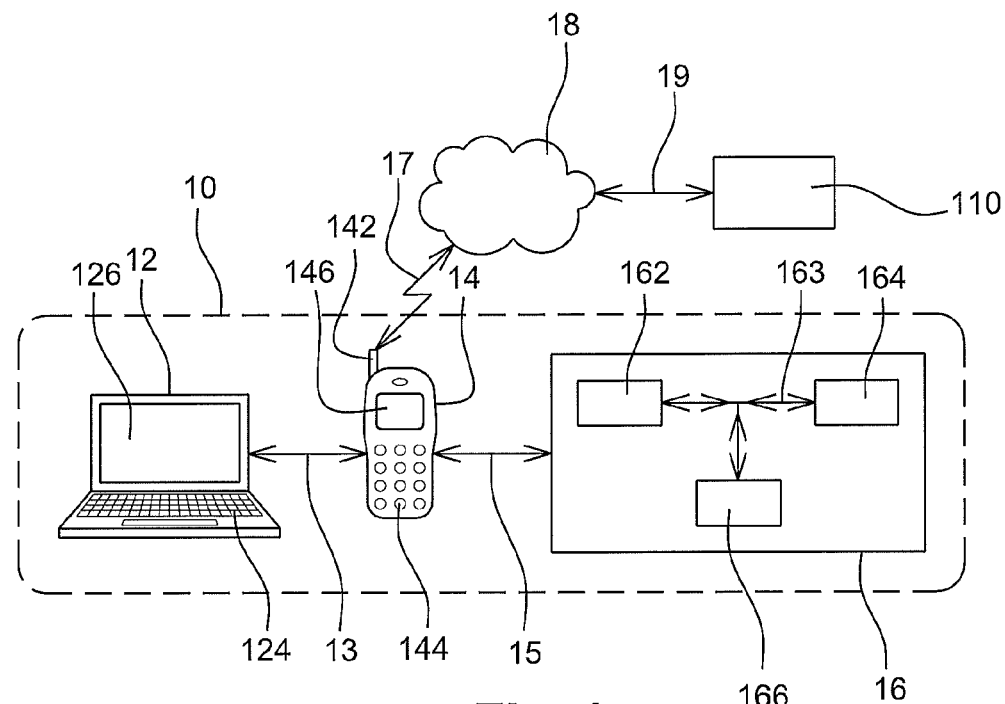
FIG. 1 illustrates a simplified diagram of one exemplary embodiment of a system for accessing at least one service, the system comprising a mobile phone, as host device, a secure chip incorporated within the host device and a PC connected to the host device, the system being adapted to offer at least one service supported by the chip, according to the invention.

FIG. 1 shows one embodiment of an electronic system 10 for accessing at least one service.

The system 10 for accessing at least one service includes a PC 12, as computer device, and, as a Mobile Equipment (or ME), a mobile (tele)phone 14 connected to the PC 12 and a secure chip 16 embedded within the mobile phone 14, as host device.

According to another embodiment (not represented), the system for accessing at least one service does not include any local PC connected to the host device. In other words, the system contains only the host device and the secure chip, also termed secure element.

The system 10 is connected, through a mobile radio-communication network 18, to a remote server 110.

For the sake of clarity and conciseness, the mobile telephone, the secure chip, the mobile radio-communication network and the remote server are termed hereinafter the phone, the chip, the network and the server respectively.

The system 10 may be located at a factory of a manufacturer of the mobile phone 14 or the secure chip 16.

The system 10 may be located within a service/support workshop of the mobile phone 14 manufacturer.

Alternately, the system is connected to, instead of a network, a test equipment (not represented). The test equipment is able to simulate a behaviour of a mobile radio-communication network and/or a server that is able to authenticate the chip and grant the ME access to a corresponding network, i.e. a network test environment.

The PC 12 comprises one or several microprocessors, as means for processing data, (or being connected to) a Man Machine Interface (or MMI), like a keyboard 124 and/or a display screen 126, as means for interfacing with a user, (or being connected to) one or several memories (not represented), as means for storing data, at least one Input/Output (or I/O) interface for exchanging data, through a wire or wireless link 13, with the phone 14.

The PC I/O interface may include a PC/Smart Card (or PC/SC) reader.

The link 13 may be constituted by a Universal Serial Bus (or USB) cable or the like.

The link 13 may consist of a short range radio-frequency link, like a Bluetooth one (trademark), or the like.

According to an important feature of the invention, the PC 12 is arranged to send, through the phone 14, to the chip 16 a command for switching from a first application that is presently activated to a second application to be activated. The first and second applications are both resident on the chip 16.

To enable the PC 12 to carry out such a control of corresponding actions to be carried out by the chip 16, the PC 12 supports preferably an application allowing to address, through the phone 14, the chip 16.

The PC 12 may be arranged to send, through the phone 14, to the chip 16 a command for modifying a content of a file(s) stored by the chip 16 accompanied with modified data that is(are) used by an application(s) that is activated or to be activated and stored within the chip 16. The modified data relating to at least one application supported by the chip 16 is then to be stored by the chip 16. Such a command for modifying a content of a file(s) accompanied with modified data may be associated with a command for switching from a first application that is presently activated to a second application to be activated.

The phone 14 plays a role of an intermediary between the PC 12 and the chip 16 while the PC 12 plays a role of a chip controller, as an originator of the sent command(s).

According to a variant (not represented), instead of a locally connected PC, as computer device, the phone is connected to a remote server that sends, through the phone, to the chip a command for switching between two applications, namely an original application that is presently activated to a target application to be activated, supported by the chip.

For example, instead of a phone, the host device may be constituted by a wireless module, a PDA, a game console, a portable TV, a tablet computer, a palm-top computer, a laptop computer, a netbook, a tablet computer, a portable PC and/or any other computer device.

As to the host device, it may be any device including one or several microprocessors, as means for processing data, comprising (or being connected to) an antenna 142 for exchanging data, through a long range radio-frequency link 17, with outside, comprising (or being connected to) a MMI, like a keyboard 144, a loudspeaker (not represented) and/or a display screen 146, as means for interfacing with a user, comprising one I/O interface(s), and comprising (or being connected to) one or several memories (not represented), as means for storing data.

The phone 14 is connected, through the antenna 142 and the long range radio-frequency link 17, to the network 18.

For simplicity reason, only one network 18 is schematically represented. However, the phone 14 may be connected, through the antenna 142 (and/or other antenna(s)), to a plurality of networks that use one or several wire and/or wireless technologies.

The network 18 may be constituted by a GSM, a UMTS, a CDMA and/or a Long Term Evolution (or LTE) type network(s). The network list is not exhaustive but only for exemplifying purposes.

The phone microprocessor processes data originating from either a phone memory or, through one or several phone I/O interface(s), outside.

Instead of a computer device or a remote server that is connected to the phone 14, the phone 14 is arranged to send to the chip 16 a command for switching from a first application that is presently activated to a second application to be activated. The first and second applications both reside on the chip 16. The phone 14, as user terminal and mobile handset, plays a role of a controller of the chip 16. To play the chip controller role, the phone may be arranged to detect a press of one or several predetermined keys of the keyboard 144. The predetermined key(s) may be, for instance, a predefined phone call number or Unstructured Supplementary Service Data (or USSD) dialed by a phone user, through the keyboard 144, so as to launch an application supported by the phone 14 and allowing to send an application switch command(s) (and/or content file modification command(s)) from the phone 14 to the chip 16. The implementation may use a call control event of a call control mechanism that interrupts a call and restores an access to a predetermined default application, such as a SIM type application.

According to a preferred embodiment, the phone 14, as host device, incorporates the chip 16 that is, for instance, soldered to the phone 14 PCB.

According to an alternative embodiment (not represented), the host device is connected, through an I/O interface of the International Organization for Standardization (or ISO) 7816 type, to a chip that is inserted, in a removable manner, into the host device. The chip 16 also includes an ISO 7816 type I/O interface, so as let communicate the chip 16 and the phone 14.

The chip 16 is connected, through a bi-directional link 15, to the phone 14.

The chip 16 plays preferably a role of a safe for data stored within the chip memory 164.

The chip 16, i.e. an integrated circuit, is preferably embedded into the phone 14, like an embedded Universal Integrated Circuit Card (or UICC).

The chip 16 includes preferentially at least one microprocessor 162, as data processing means, at least one memory 164, and at least one I/O interface 166 which are internally linked together through a data and control bus 163.

The chip memory 164 can be constituted by one or several EEPROM (acronym for "Electrically Erasable Programmable Read-Only Memory"), one or several ROM (for "Read Only Memory"), one or several Flash memories and/or any other memories of different types, like a RAM (for "Random Access Memory") type.

The chip microprocessor 162 processes data originating from either a chip memory 164 or, through one or several phone I/O interface(s), outside.

The chip memory 164 stores at least one SIM type application, for example, a SIM application(s) for a GSM network (s), a USIM application(s) for a UMTS network(s), a CSIM application(s) for a CDMA network(s) and/or an ISIM application(s) for IMS, and/or at least one test SIM type application, for example, a test SIM application(s) for a GSM network(s), a test USIM application(s) for a UMTS network(s), a test CSIM application(s) for a CDMA network(s) and/or a test ISIM application(s) for IMS.

All the resident applications are pre-installed into the chip 16. A file may be dedicated to presenting a list of all applications supported by the chip 16 by a label (or name) for each application. Each application contained in such a list may be the currently activated application or an application to be activated. The file may further indicate other parameter(s) associated with at least one application, such as an Original Equipment Manufacturer (or OEM) of the host device, a Mobile Network Operator (or MNO) (or a Wireless Carrier), and/or a vendor of a corresponding test equipment.

The chip 16 is adapted to receive from an external entity, like a local PC 12 or a remote server, a command for switching from a currently activated application to another application to be activated, and activate the application to be activated and de-activate the currently activated application.

The chip 16 may be adapted to receive from an external requesting entity, like the local PC 12, the phone 14 or a remote server, a command for modifying a content of a file(s) accompanied with modified data, and write into the chip memory 164 the modified data by possibly updating data within the concerned file(s) and/or creating an additional file.

The file(s) may be one or several so-termed Master File(s) (or MF), one or several Directory File(s) (or DF), and/or one or several Elementary File(s) (or EF).

Optionally, the chip 16 authorizes a requested modification of the file content only if the external requesting entity also provides rights for writing data, such as a Personal Identity Number (or PIN) or the like.

Modified data includes non-executable data relating to at least one SIM type application and/or at least one test SIM type application, such as data allowing to be authenticated to at least one network 18 and/or a test equipment (not represented) simulating at least one network. Such data may comprise a network authentication key(s) K and/or Ki associated with a network user/subscriber, such as an International Mobile Subscriber Identity (or IMSI), and authenticating the user to the network, an encryption key Kc allowing to encrypt data to be exchanged between the chip 16 and an external entity, such as the server 110, to access a service from the chip 16. Such data may comprise an algorithm key(s) and/or a variable(s), e.g. rotational and/or cyclic constants for an authentication algorithm(s), like, for instance, Milenage, COMP128 and/or XOR algorithm(s), so that a master keyset of the chip 16 comprises a subscriber key K, a value OPc used with a security function and constant(s) relating to the currently activated application.

The chip memory 164 stores an application offered to the PC 12 or phone 14 user. When the chip microprocessor 162 executes the application, it allows to switch from a first application to a second application and/or modify data (as a content of a file(s) that is(are) to be read by an application(s) supported by the chip 16) relating to at least one application.

The user may access such a stored application and triggers its execution thanks to a corresponding Application IDentifier (or AID) that is selected and originates from an external requesting entity, like the local PC 12, the phone 14 or a remote server.

The user may access such an application and triggers its execution, through a SIM application ToolKit/Card Application ToolKit (or STK/CAT) type like menu or a Web server embedded within the chip 16 that lists all the applications supported by the chip 16, among which the invention application is present.

Such an invention application may be written in an object-oriented language, such as Java, also termed applet when developed in Java. According to such a corresponding embodiment, the chip memory 164 stores a Java Virtual Machine (or JVM) that interprets and executes the applet.

The chip microprocessor 162 preferably executes security functions, in order to protect an access to information, like data stored and/or managed by the chip 16.

The security functions include preferably a user authentication application to be executed before accessing, in particular, data stored within the chip memory 164. To authenticate the user, the chip 16 may store an application for verifying a PIN or personal biometrics data stored securely within the chip 16 and to be input by the chip 16 user, so as to compare with the stored PIN or personal biometrics data and authorize, when successful, a running of any application supported by the chip 16.

The security functions include preferentially an encryption/decryption process to be used before sending data to outside/after receiving data from outside, so as to protect access to the data managed by the chip 16. To encrypt data to be sent, the chip 16 uses a key that is stored within the chip memory 164 and an encryption algorithm, such as an Advanced Encryption Standard (or AES), a Data Encryption Standard (or DES) or the like. To decrypt data to be received, the chip 16 may use a key that is stored within the chip memory 164 and a decryption algorithm, such as an AES, a DES or the like.

The chip microprocessor 162 is preferably able to initiate actions, in order to interact directly with the outside world, in an independent manner of the phone 14. Such a capacity of interaction at the initiative of the chip 16 is also known as proactive capacity. The chip 16 is thus enable to send to the phone 14, at its own initiative, a proactive command, such as "Display text", for displaying, through the phone display screen 146, some predefined message, a proactive command "Refresh", for re-initializing the chip 16, another proactive command for requesting a user input, through the phone 14 MMI, and/or other command(s).

The chip memory 164 may store user data, like a first name, a last name, a bank account number, a birth date, a private key, a PIN, one biometrics print(s) (like a fingerprint(s), a facial print(s) and/or an iris print(s)) and/or other appropriate data.

The stored user data may be accessed, so as to be provided to the server 110.

Once the chip 16 has switched to a newly activated application, the chip 16 uses data stored within the chip memory 164, like an IMSI, as a unique number for identifying a subscriber in relation to one GSM, UMTS, CDMA and/or LTE type network(s), and an associated key Ki allowing to authenticate a user to either the network 18 or another network or a simulated network, while changing one or several authentication key(s) and/or one or several radio-interface parameters.

The server 110 is connected, through a wire bi-directional link 19, to the network 18.

The server 110 to be addressed is identified within data stored within the chip memory 164. The server 110 may be identified by an Uniform Resource Identifier (or URI), like an Uniform Resource Locator (or URL), as server identifier.

The server 110 comprises one microprocessor(s), as means for processing data, means for storing data and one I/O interface(s).

The server 110 is hosted by a computer and is dedicated to running an application for managing one or several network services.

The server 110 may be operated by either a mobile radio-communication network operator or on its behalf, a bank operator and/or a service provider or on its behalf. As service provider, it may also be a company, as a transport operator, that manages a transport service, like a bus, a train, a plane and/or a loyalty service.

The server 110 is able in particular to analyze whether authentication data, like a key(s), that is received from the chip 16 does allow or does not allow the requesting user to access a service(s) managed by the server 110.

Figure 2:
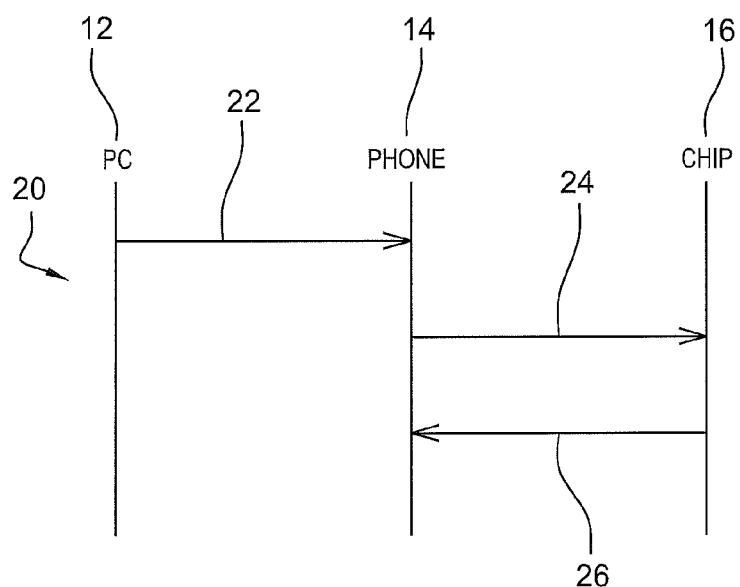
FIG. 2 represents a simplified message flow of one exemplary embodiment of a method implemented notably by the entities of the system of FIG. 1, so that a PC user accesses a service managed by the secure chip under the PC control.

FIG. 2 depicts an example of steps 20 of a method implemented by the PC 12, the phone 14 and the chip 16.

Several scenarios for a substitution of the application to be activated for the currently activated application are possible. Only some scenarios are presented herein below.

As a first scenario, the currently activated application is a SIM type application and the application to be activated is a test SIM type application that is possibly selected amongst among several test SIM type applications.

As a second scenario, the currently activated application is a first test SIM type application and the application to be activated is a second test SIM type application that is possibly selected amongst several test SIM type applications.

As a third scenario, the currently activated application is a test SIM type application and the application to be activated is a SIM type application that is possibly selected amongst several SIM type applications.

As a fourth scenario, the currently activated application is a first SIM type application and the application to be activated is a second SIM type application that is possibly selected amongst several SIM type applications.

Each scenario allows a PC user to access a service offered by the chip 16 and corresponding to the application to be activated instead of the currently activated application.

By switching from the currently activated application to the application to be activated, it may allow to switch or change from first data to second data, like from a first authentication algorithm to a second authentication algorithm, which the application to be activated points to (instead of the first data which the currently activated application points to).

The PC display screen 126 may display, preferably through an intuitive user interface, a list of labels (or names) of test SIM type applications offered from the chip 16. Such a list of labels of test SIM type applications may be stored within a file present within the chip 16, like an EF-DIR (for Directory). Such a list registers of labels of test SIM type applications all AIDs, DFs and labels of the supported test SIM type applications, as applications that may be activated. The PC 12 user selects, through the PC 12 MMI, from the displayed list, the desired test SIM type application identified by its label.

In the explained example, the PC 12 user desires, through the PC 12 MMI, via an application supported by the PC 12 and an application supported by the chip 16, to switch from a SIM type application that is currently activated, as a first application, to a (possibly selected) test SIM type application, as a second application.

The PC 12 (and more exactly its microprocessor) triggers an execution of the application that is supported by the PC 12 and allows to launch the application supported by the chip 16 that allows to switch from the first to the second application resident on the chip 16.

The PC 12 addresses to the phone 14 a command 22, like, for instance, an ATtention (or AT) command, for switching from the first application to the second application.

After having received this command 22, the phone 14 sends to the chip 16 a command 24 for switching from a first application to a second application.

The phone 14 and the chip 16 may use Application Protocol Data Unit, as the protocol for exchanging data.

The chip 16 triggers an execution of the application allowing to switch from a first to a second application.

The chip 16 stores all non-executable data relating to the first application that is fetched by the first application and data relating to the first application, so as to be able to retrieve it for a restoration of the first application.

As non-executable data relating to the first application, it may be constituted like, for instance, a key(s) and/or an authentication value(s), as data allowing to be authenticated to either one network(s) or a test equipment simulating an operating of at least one network(s).

The chip 16 may update the file EF-DIR dedicated to presenting the list of labels of test SIM type applications to point, instead of the first application, the second application, so as activate the second application and de-activate the first application.

Once the chip 16 has activated the second application and de-activated the first application, the chip 16 sends to the phone 14 a command 26, like a proactive command "REFRESH", for re-initializing the chip 16.

The chip 16 presents the second application instead of the previously presented first application.

The PC user may let the chip 16 execute the presented second application.

The chip 16 may execute automatically, once re-initialized, the presented second application.

The invention solution is user friendly by reducing a number of the manual intervention operations carried out by a user. As a matter of fact, it allows a user to avoid to manually insert a smart object supporting a test SIM type application after having removed another smart object supporting a SIM type application from the host device.

Moreover, it is also possible to configure the invention application supported by the chip 16, so that, after a predetermined number of reset operations, the application allows to select the initially activated application, like a SIM type application.

The invention claimed is:

1. A method for accessing at least one service, via a host device coupled to a chip, the chip storing data relating to at least one test Subscriber Identity Module (SIM) type application and/or data relating to at least one SIM type application, comprising the following steps:

the host device sends to the chip a command for switching from a first application to a second application, the first application being either a test SIM type application or a SIM type application, the second application being either a SIM type application or a test SIM type application; and the chip carries out an activation of the second application and a de-activation of the first application.

2. The method according to claim 1, wherein a computer device is connected to the host device, and further including a step in which the computer device sends to the host device the command for switching from the first application to the second application.

3. The method according to claim 1, wherein a computer device is connected to the host device, and further including steps in which the computer device modifies data relating to at least one SIM type application and/or data relating to at least one test SIM type application and sends, through the host device, to the chip at least one command for modifying a content of at least one file stored by the chip accompanied with modified data relating to at least one SIM type application and/or modified data relating to at least one test SIM type application, and the chip stores the modified data relating to at least one SIM type application and/or the modified data relating to at least one test SIM type application.

4. The method according to claim 1, wherein a remote server is connected to the host device, and further including a step in which the remote server sends to the host device the command for switching from the first application to the second application.

5. The method according to claim 1, wherein a remote server is connected to the host device, and further including steps in which the remote server modifies data relating to at least one SIM type application and/or data relating to at least one test SIM type application and sends, through the host device, to the chip at least one command for modifying a content of at least one file stored by the chip accompanied with modified data relating to at least one SIM type application and/or modified data relating to at least one test SIM type application, and the chip stores the modified data relating to at least one SIM type application and/or the modified data relating to at least one test SIM type application.

6. The method according to claim 1, wherein, before de-activating the SIM type application or the test SIM type application, the chip stores non-executable data relating to the SIM type application or the test SIM type application respectively.

7. The method according to claim 6, wherein the non-executable data relating to the SIM type application or the test SIM type application includes at least one piece of data that enables an entity to be authenticated to either at least one mobile radio-communication network or a test equipment simulating operation of at least one mobile radio-communication network.

8. The method according to claim 1, wherein the command for switching from the first application to the second application includes a command using Application Protocol Data Unit.

9. The method according to claim 1, wherein, once chip has activated the second application and de-activated the first application, the chip sends to the host device a command for re-initializing the chip.

10. A system for accessing at least one service, the system comprising a host device and a chip coupled to the host device, the chip comprising means for storing data relating to at least one test Subscriber Identity Module (SIM) type application and/or data relating to at least one SIM type application, wherein the host device is configured to send to the chip a command for switching from a first application to a second application, the first application being either a test SIM type application or a SIM type application, the second application being either a SIM type application or a test SIM type application; and wherein the chip is configured to carry out an activation of the second application and a de-activation of the first application.

* * * * *